(12) United States Patent　　　　(10) Patent No.:　US 12,645,765 B2

Duncan　　　　　　　　　　　　　　(45) Date of Patent:　Jun. 2, 2026

---

(54) SECURE INFORMATION DELIVERY IN AN UNTRUSTED ENVIRONMENT

(71) Applicant: LiveRamp, Inc., San Francisco, CA (US)

(72) Inventor: Joseph Shannon Duncan, Conway, AR (US)

(73) Assignee: LiveRamp, Inc., San Francisco, CA (US)

( * ) Notice: Subject to any disclaimer, the term of this patent is extended or adjusted under 35 U.S.C. 154(b) by 114 days.

(21) Appl. No.: 18/710,134

(22) PCT Filed: Nov. 19, 2022

(86) PCT No.: PCT/US2022/050510

§ 371 (c)(1),
(2) Date: May 14, 2024

(87) PCT Pub. No.: WO2023/091731

PCT Pub. Date: May 25, 2023

(65) Prior Publication Data

US 2025/0007895 A1　　　Jan. 2, 2025

Related U.S. Application Data

(60) Provisional application No. 63/281,420, filed on Nov. 19, 2021.

(51) Int. Cl.
　　*G06F 21/10*　　　(2013.01)
　　*H04L 9/40*　　　(2022.01)
(52) U.S. Cl.
　　CPC .......... *G06F 21/10* (2013.01); *H04L 63/0281* (2013.01); *H04L 63/0442* (2013.01); *H04L 63/0807* (2013.01)

(58) Field of Classification Search
　　CPC . G06F 21/10; H04L 63/0281; H04L 63/0442; H04L 63/0807
　　See application file for complete search history.

(56) References Cited

U.S. PATENT DOCUMENTS 8,307,413 B2　11/2012　Smadja et al.
8,782,393 B1　7/2014　Rosthstein et al.
　　　　　　(Continued)

OTHER PUBLICATIONS

Jason Barto and Stefan Natu, Building secure machine learning environments with Amazon SageMaker, Feb. 10, 2021.

(Continued)

*Primary Examiner* — Techane Gergiso

(57) ABSTRACT

A system for secure delivery of data, algorithms, or intellectual property into an untrusted environment utilizes an embedded transcoder within the client computing environment. The embedded transcoder takes advantage of cloud computing functionality to isolate the embedded transcoder from the client application, with a proxy junction between the client application and embedded transcoder. Communication to a provider cloud environment is maintained through a generic authentication appliance system (GAAS) with a client-facing application programming interface (API), with the GAAS also communicating to the customer cloud environment components through the proxy junction. To provide the client application permission to access specific components within the provider application, the API authorizes the client application through tokens activated with public/private keys.

20 Claims, 6 Drawing Sheets

(56) References Cited

U.S. PATENT DOCUMENTS

| | | | | |
|---|---|---|---|---|
| 10,341,302 | B2 | 7/2019 | Khazan et al. | |
| 10,700,865 | B1 | 6/2020 | Hendrick et al. | |
| 11,095,706 | B1 | 8/2021 | Ankam et al. | |
| 11,146,398 | B2 | 10/2021 | Haque et al. | |
| 11,394,710 | B1 * | 7/2022 | Royal | H04L 63/0281 |
| 11,805,127 | B1 * | 10/2023 | Sundar | H04L 63/102 |
| 2016/0065555 | A1 * | 3/2016 | Branden | H04L 63/0807 |
| | | | | 726/7 |
| 2016/0226831 | A1 | 8/2016 | Kim et al. | |
| 2017/0286696 | A1 | 10/2017 | Shetty et al. | |
| 2017/0286698 | A1 | 10/2017 | Shetty et al. | |
| 2018/0367526 | A1 * | 12/2018 | Huang | H04L 63/0807 |
| 2019/0007409 | A1 | 1/2019 | Totale et al. | |
| 2020/0007531 | A1 * | 1/2020 | Koottayi | H04L 67/146 |
| 2020/0076794 | A1 * | 3/2020 | de Boer | H04L 9/3213 |
| 2020/0213297 | A1 * | 7/2020 | Suraparaju | H04L 63/0892 |
| 2021/0218742 | A1 * | 7/2021 | Cook | H04L 63/0892 |
| 2021/0288794 | A1 * | 9/2021 | O'Neill | H04L 9/3247 |
| 2021/0409403 | A1 * | 12/2021 | Lewin | H04L 67/145 |
| 2022/0078016 | A1 * | 3/2022 | Haque | H04L 63/062 |
| 2022/0353261 | A1 * | 11/2022 | Totale | H04L 63/0815 |

OTHER PUBLICATIONS

Amazon Web Services, Build a Secure Enterprise Machine Learning Platform on AWS, May 11, 2021.

Azure, Azure guidance for secure isolation, Oct. 11, 2021.

Saeed Aghabozorgi and Stefan Natu , Private package installation in Amazon SageMaker running in internet-free mode, Nov. 30, 2020.

AWS-Samples, Amazon SageMaker secure MLOps, Sep. 30, 2021.

Xianrui Meng, Joan Feigenbaum, Privacy-Preserving XGBoost Inference, Dec. 31, 2020.

Extended European Search Report in corresponding EPO Patent Application No. 22896566.1, dated Apr. 7, 2025.

* cited by examiner

SECURE INFORMATION DELIVERY IN AN UNTRUSTED ENVIRONMENT

CROSS-REFERENCE TO RELATED APPLICATIONS

This application claims the benefit of U.S. provisional patent application No. 63/281,420, filed on Nov. 19, 2021. Such application is incorporated herein by reference in its entirety.

BACKGROUND

It is often the case that information of various sorts (including intellectual property, data, and/or algorithms) may need to be delivered across a computer network into an environment that is unsecure or semi-secure. An example of this situation is consumer information being sent from an application accessed by the consumer across a network to the application provider. This delivery of information creates the potential risk of data exposure or misuse of the information by a bad actor. The risk becomes greater when the information that is being delivered contains either provider's secret data or customer's personally identifiable information (PII) or other forms of sensitive information, and when the application provider does not follow standard best practices to safeguard the information.

A related problem is that a consumer or other person using an application may need to be appropriately permissioned to access specific components/services within the application, rather than allowing the consumer to have unlimited and/or unrestricted access to the application. This may be necessary to protect the data, algorithms, and/or intellectual property of the application provider.

Another related problem is that the application provider may need metrics from the consumer or other user's use of the application. These metrics need to be delivered in a manner that is safe, despite the fact that the information passes through an unsecure network and/or environment.

SUMMARY

The present invention is directed to a system and method by which an application provider may deploy its application directly into a consumer's environment, without the need for the consumer to share the consumer's data, and at the same time allow the consumer to use the provider's application. Because the data does not leave the consumer's environment, there is no risk that the data will be exposed or misused by a bad actor.

To provide the consumer permission to access specific components or services within the provider application, while simultaneously protecting other portions of the application in order to safeguard provider data, algorithms, and intellectual property, an authentication application programming interface (API) is created in the provider's environment. The API authorizes the consumer through tokens to allow access to specific components and/or services of the provider's application, according to the provider's preferences and the consumer's needs.

In order to provide metrics regarding customer usage to the provider, the application ports the metrics from the application hosted within the consumer's network isolated environment to the provider's environment while simultaneously maintaining confidentiality and integrity of the metrics data that is being transported.

In certain embodiments of the present invention, a customer, client, subscriber, or other user of an application installs the application product in their cloud environment, such as Amazon AWS. This is typically done by setting up the necessary infrastructure in their cloud environment. The setup and installation may be done through an automated infrastructure setup service such as AWS Cloudformation. The provider may provide a configuration template that the Customer would use in their Cloudformation service. The configuration template, in certain embodiments, may create three main services along with other resources. The first is an API Gateway; this is a customer-facing API that has two main endpoints INIT and REQUEST. The second is a proxy function, which may be an AWS Lambda function that delivers tokens and acts as a medium between the customer-installed application and the provider. The third is an embedded transcoder, which is a proprietary application from the provider, which may in certain implementations be hosted in AWS Sagemaker through network isolation. AWS Sagemaker is a cloud-based secure platform that enables developers to create, train, and deploy machine-learning models and other facilities in the cloud; other providers' products could be used in alternative embodiments.

In certain embodiments the invention may be characterized by three important components. A first component is a generic authentication appliance system (GAAS). This system includes the authentication API that authorizes the client applications to access the provider's applications that process the customer's data. It also provides specific permissions to these client applications thereby allowing the customer to access only those components/services that the provider wishes to be accessed by the customer. A second component is a confidential compute environment. Major cloud providers like AWS provide a network isolated environment (such as AWS Sagemaker) where the provider can deploy proprietary applications. As the environment is network isolated no one can access the application's data or source code hosted in this environment and download it, but can use it in a manner approved and controlled by the application provider. The provider may then package its proprietary source code, algorithms, and/or intellectual property as a container and deploy that container into the confidential compute environment. A third component is a proxy application. A proxy application works as a medium between the provider's hosted application in the customer's network-isolated environment and the GAAS hosted in the provider's environment. The proxy application has two main purposes. One purpose is to submit an API request with the credentials to the provider's GAAS API and receive an authentication token. Another purpose is to use that authentication token along with the client's input data and call the provider's application (hosted in the network-isolated environment) that processes the client's input data and renders the results.

These and other features, objects and advantages of the present invention will become better understood from a consideration of the following detailed description of the preferred embodiments and appended claims in conjunction with the drawings as described following:

DRAWINGS

DESCRIPTION

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

Figure 1:
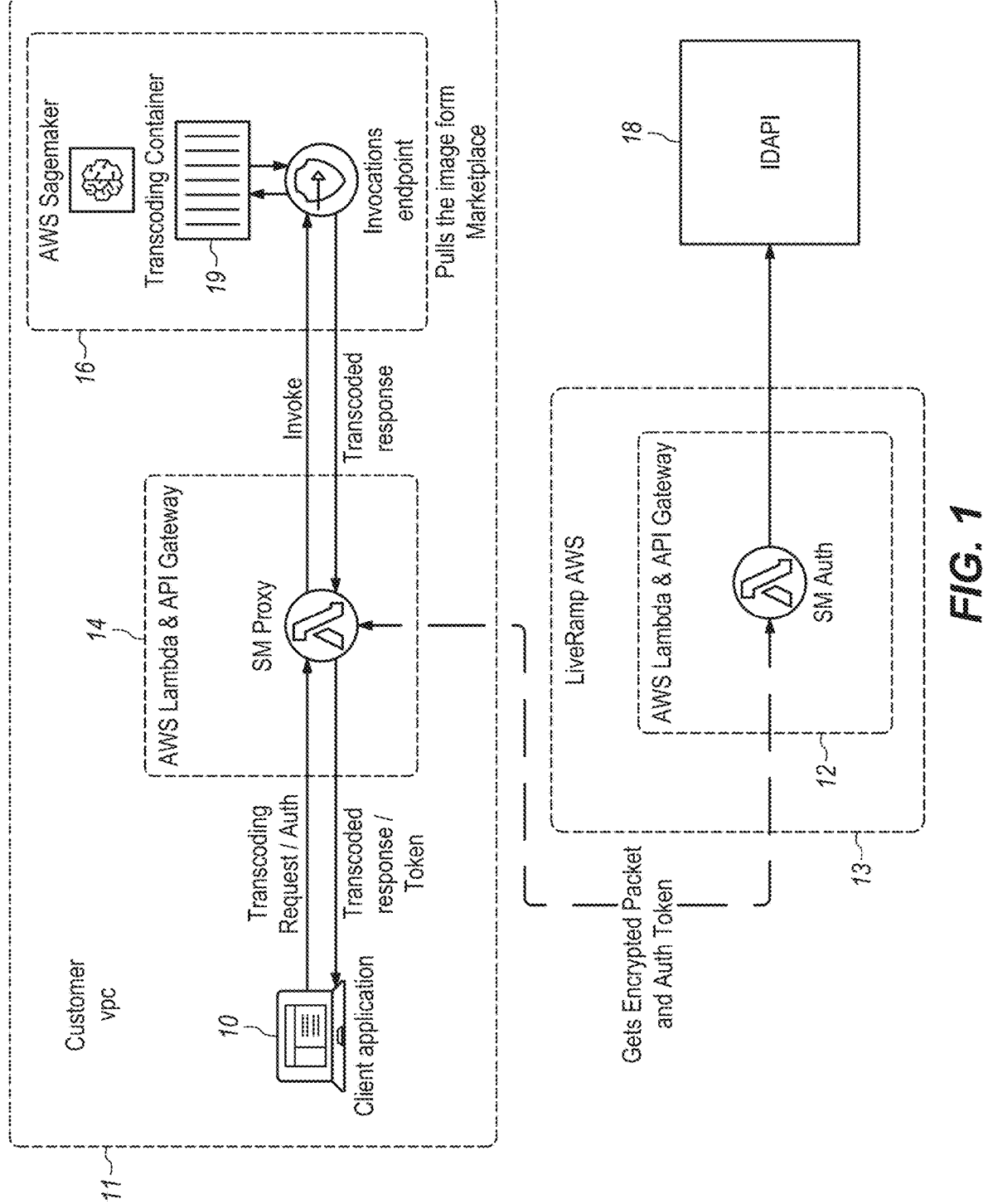
FIG. 1 is an overall system architectural view according to a preferred embodiment of the present invention.

Referring now to FIG. 1, an environment for an embodiment of the invention may now be described. Customer/ client application 10 resides in customer cloud environment 11. This application may be used for various computing purposes, such as processing of customer data housed in customer cloud environment 11, and is delivered by the provider. Generic Authentication Appliance System (GAAS) 12 includes an API gateway that allows for authorization of client application 10 to access various features. It allows for specific permissions to client application 10 thereby allowing the customer to only access components and services that are approved for use by that customer according to the provider. Proxy function/application 14 works as a medium between client application 10, in the customer cloud environment 11, and GAAS 12, in the provider cloud environment 13. Proxy function 14 may submit an API request with credentials to GAAS 12, and receive an authentication token back from GAAS 12 along the network path shown in FIG. 1. Proxy function 14 may then use the authentication token, along with the client's input data, to call the embedded transcoder 16 (hosted in the network isolated environment at customer cloud environment 11) to process the client's data and render results. Container 19 houses private provider data, algorithms, and/ or intellectual property securely within customer cloud environment 11, thereby preventing unlimited access by client application 10. IDAPI 18 functions as a source of truth in the system, as described below.

Figure 6:
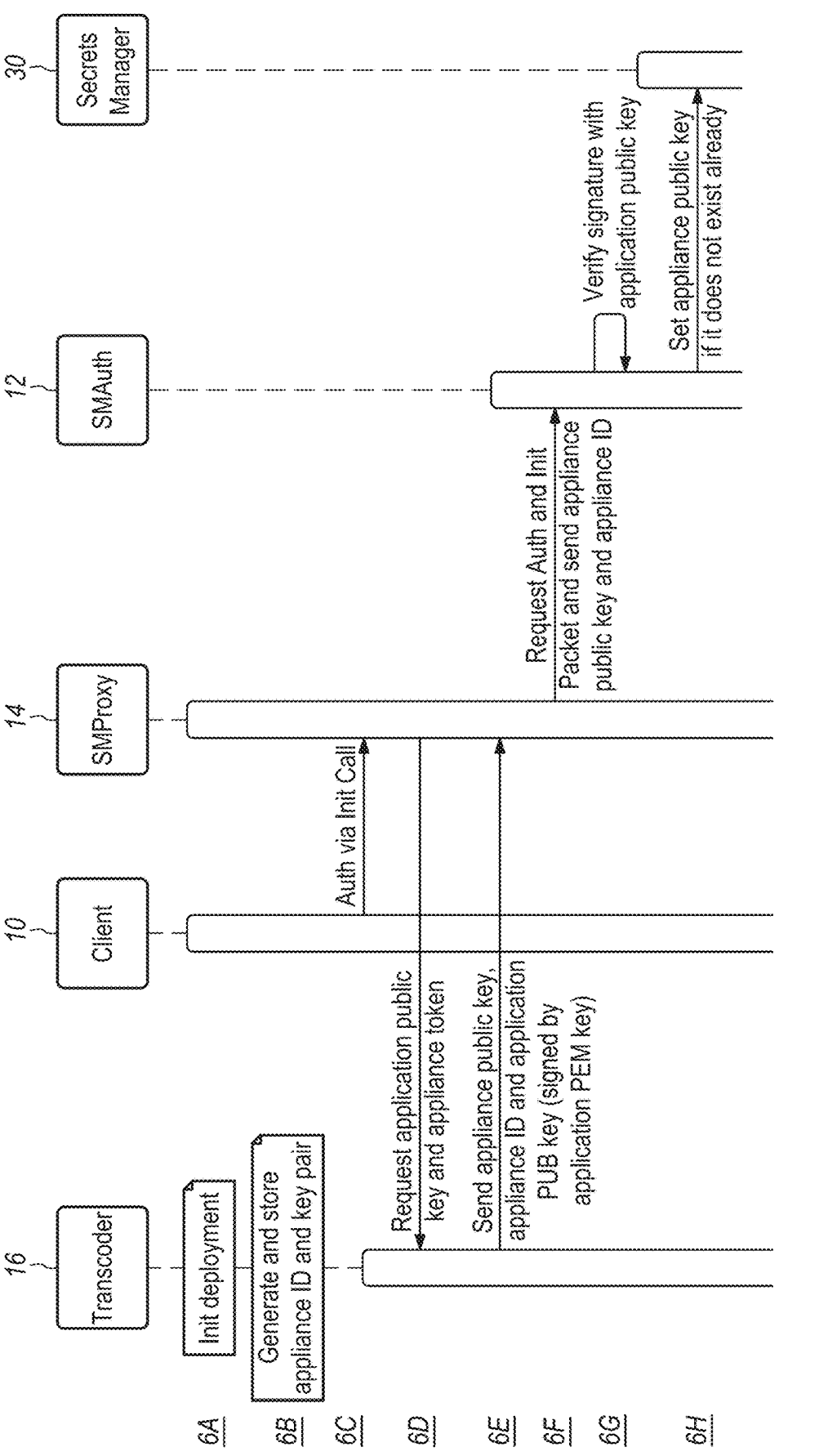
FIG. 6 is a swim lane diagram for the operation of a generic authentication appliance system (GAAS) according to a preferred embodiment of the invention.

Referring now to FIG. 6, the role of GAAS 12 (generic authentication appliance system) and how the keys are generated for the system may now be described. Embedded transcoder 16 is packaged with 3 different types of keys which are: a decode key—a public Rivest-Shamir-Adleman (RSA) key generated using openssl; an application_ pub_key—a public RSA key generated using openssl; and an application_pem_key—a private RSA key corresponding to the application_pub_key. Simultaneously, SMAuth (i.e., GAAS 12 in the AWS environment) is updated to save the same application_pub_key (that was packaged inside embedded transcoder 16) within its secrets manager 30 and an encode_key which is a public RSA key corresponding to the decode key packaged inside embedded transcoder 16.

When Embedded Transcoder 16 is installed and running within the consumer's cloud environment at step 6A, it generates a key pair called appliance_pub_key(public RSA key) and appliance_pem_key(private RSA key) upon start at step 6B, and stores those keys in memory. When the client application 10 sends the INIT request to SM Proxy 14 at step 6C, it performs three sequential actions. First, it sends a request to the embedded transcoder 16 at step 6D with rpc value as init_keys. Upon receiving this request, embedded transcoder 16 creates a JSON response called appliance response at step 6E, which contains two keys: appliance_ pub_key signed with application_pem_key called appliance token and application_pub_key. Once this response is received by SM Proxy 14, the second action begins by calling the GAAS 12 init endpoint at step 6F. GAAS 12 receives the request for validating and sends back an INIT token. It then reads the application_pub_key within the request and validates if it exists in its secrets manager 30. Once the existence of application_pub_key has been validated, GAAS proceeds to validate the signature of appliance token with its application_public_key at step 6G. Once the signature has been validated it then stores the appliance_ pub_key within its secret manager 30 at step 6H. Hereafter GAAS uses the appliance_pub_key as a public key also referred as encryption key for encrypting secret data and further uses the pre-configured private key also referred as encode key for encoding/signing the data. In embedded transcoder 16 the corresponding keys are appliance_pem_key that is used as a private key also referred as decryption key for decrypting the secret data and a preconfigured public key also referred as decode_key to decode or validate the signature of the encoded data. The third action of the INIT flow is described below.

In order to set up customer cloud environment 11, a customer may use an automated infrastructure setup service such as AWS Cloudformation. The provider may use a configuration template to build the proxy function 14 and embedded transcoder 16 components, as further described below.

Figure 2:
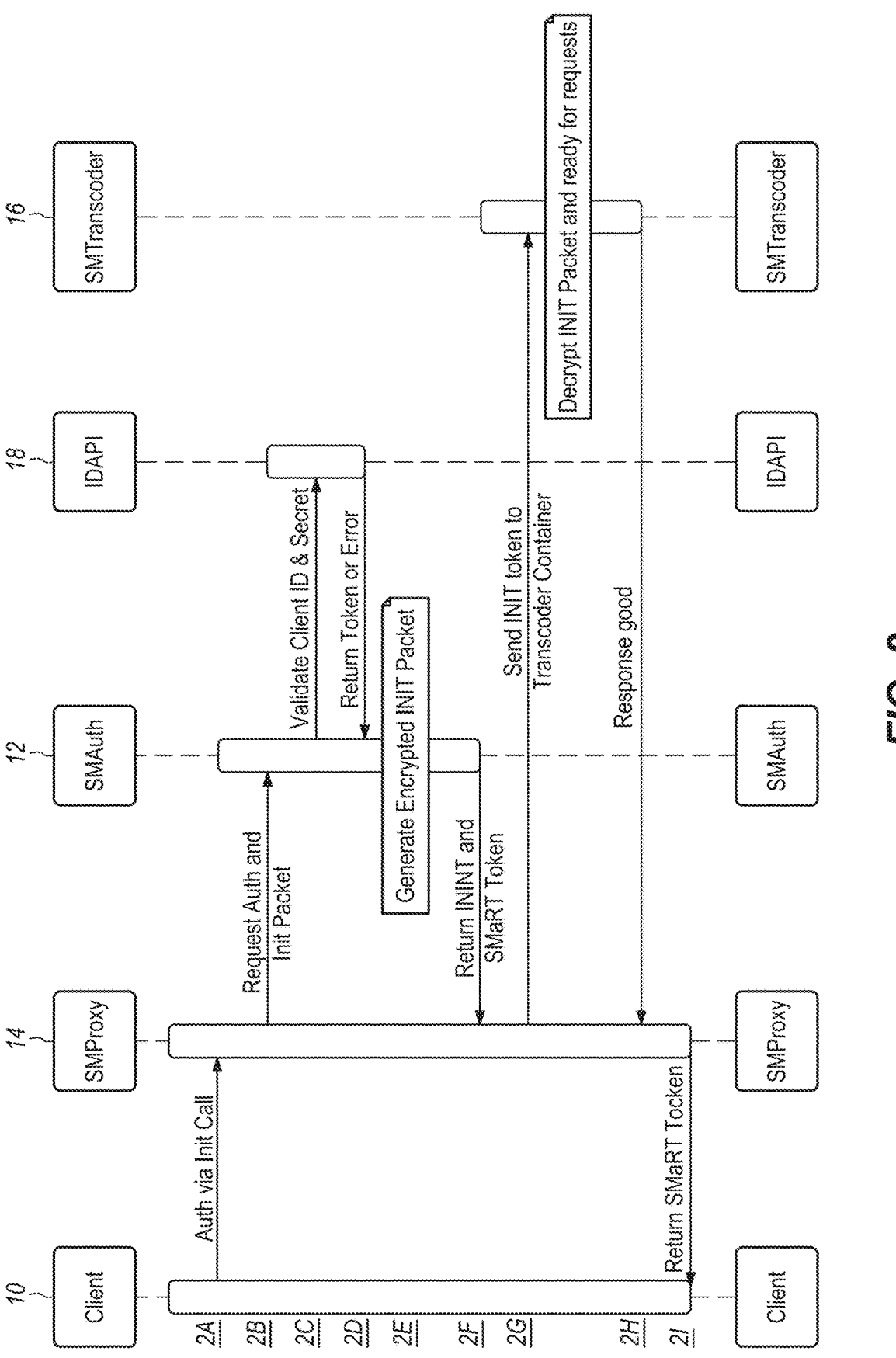
FIG. 2 is a swim lane diagram for an initialization procedure according to a preferred embodiment of the present invention.

The process for enabling the use of data, algorithms, or intellectual property by client application 10 may now be continued beginning with the INIT flow, shown with reference to the swim lane diagram of FIG. 2. Embedded transcoder 16 contains a public key called the decode key that has a corresponding private key called the encode key within GAAS 12. Embedded transcoder 16 also contains a private key called the decryption key that has a corresponding public key called the encryption key within GAAS 12. To initiate the embedded transcoder 16 application for use, the customer application 10 calls the proxy function 14's API Gateway's INIT endpoint with the customer credentials at step 2A. The API Gateway invokes the proxy function 14 that in turn calls GAAS 12 within provider cloud environment 13 in order to generate an INIT token at step 2B. The INIT token has secret key data that would be used for the embedded transcoder 16 to operate. To generate this INIT token, GAAS 12 first validates customer application 10's credentials against backend system IDAPI 18, at step 2C. GAAS 12 retrieves the secret key data from IDAPI 18, at step 2D, as this system is the "source of truth" for the provider. GAAS 12 then proceeds to create a JSON Web Token called the INIT token using the secret key data from IDAPI 18, at step 2E. The INIT token is sent to proxy 14 at step 2F.

The secret key data within the INIT token needs to be kept confidential, and therefore GAAS 12 internally generates a random session key by encrypting it with an RSA public key and then encrypts the secret data with the encrypted session key using AES (Advanced Encryption Standard) specification generating a cipher text. GAAS 12 also ensures the integrity of the data by signing the INIT token with the private encode key. The INIT token is sent to embedded transcoder 16, at step 2G. Once this INIT token is received by embedded transcoder 16, it decodes the token with its public decode key to validate the source. Once the source is validated it then decrypts the encrypted session key with its RSA private decryption key and then uses the decrypted session key to decrypt the cipher text generated by GAAS 12 using AES (Advanced Encryption Standard) specification, and stores this data within the machine on which it is hosted within customer cloud environment 11. Because the machine that hosts the application is network isolated, there is no possibility for the secret key data to be leaked.

After the embedded transcoder 16 application completes the process of saving the secret key data, it proceeds to send an acknowledgement to the proxy function 14, at step 2H. Proxy function 14 then delivers the success response to the customer application 10, at step 2I. Throughout this process, if any of the validations fail either because of invalid/incorrect information either in GAAS 12 or embedded transcoder 16, then customer application 10 receives an error message stating that the validation has failed. Once initialization is complete, customer application 10 receives a response containing the success acknowledgement along with another JSON Web Token called the SMART token, also at step 2I. The initialization is valid for 24 hours and the client needs to re-initialize after that as the embedded transcoder 16 invalidates the secret data at the end of 24 hours.

Figure 3:
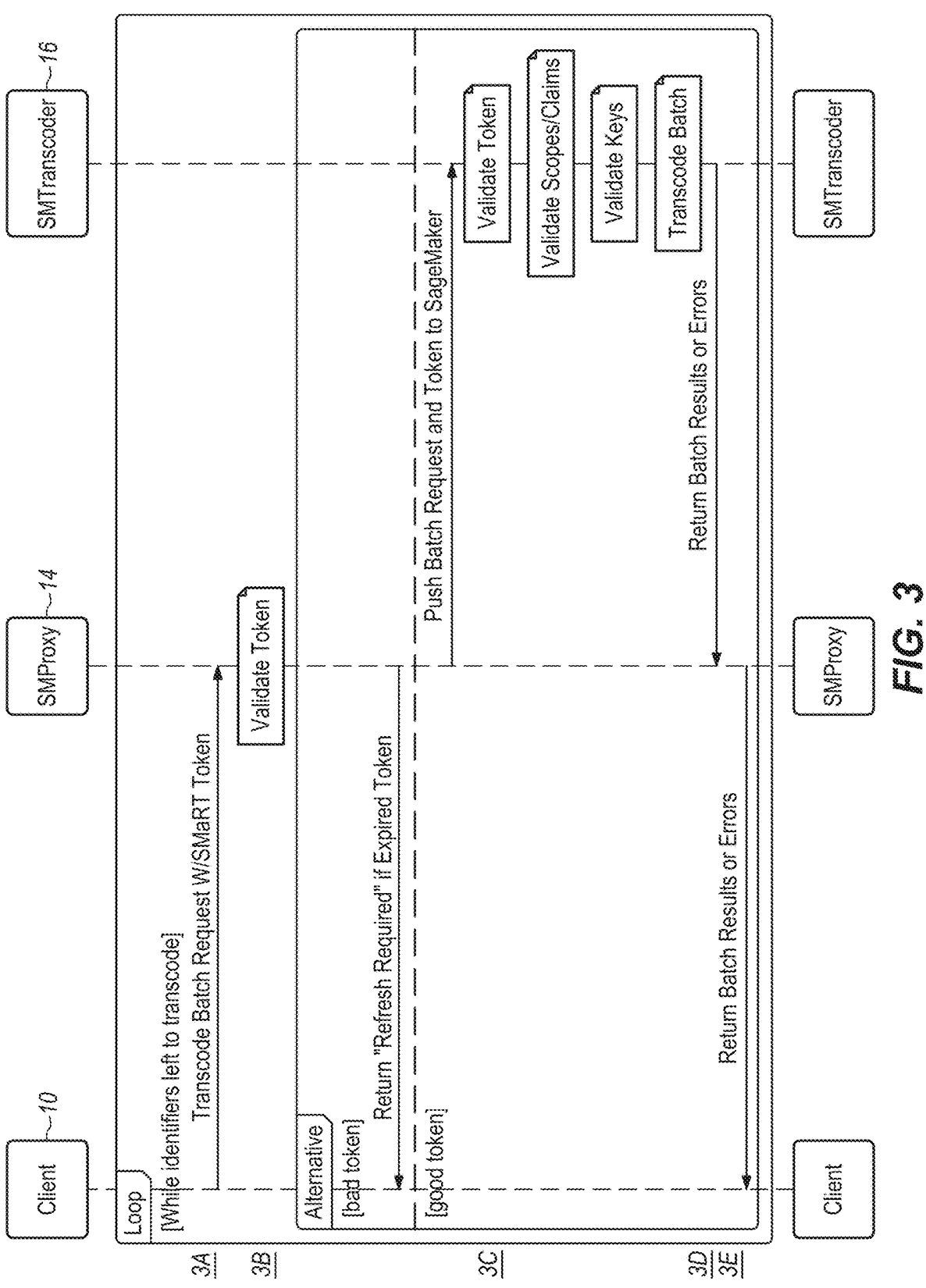
FIG. 3 is a swim lane diagram for a request procedure according to a preferred embodiment of the present invention.

Processing for the REQUEST flow may be described with reference to the swim lane diagram of FIG. 3, showing the REQUEST process that is repeated, in an embodiment, every 15 minutes for improved security. A SMART token consists of details specific to customer application 10's access that embedded transcoder 16 needs to process the customer input data. Customer application 10 calls proxy function 14 with its input data and the SMART token as input parameters at step 3A. The Proxy function then invokes the embedded transcoder 16 within the protected environment inside the customer cloud environment 11 to accept this request at step 3B. The embedded transcoder 16 next proceeds to perform the validations with its keys to validate the SMART token at step 3C. Once validated, it processes the input data and returns the results to proxy function 14 at step 3D, which in turn returns it to the customer application 10 at step 3E.

In the above REQUEST process if any of the validations fail because of invalid/incorrect information in embedded transcoder 16, then customer application 10 will receive an error message stating that the validation has failed. As the SMART tokens are valid only for a limited time period, such as 15 minutes, customer application 10 refreshes the token using the same Proxy function 14, which sends an authentication request to GAAS 12, which will render a fresh token after validation for each refresh request.

Figure 4:
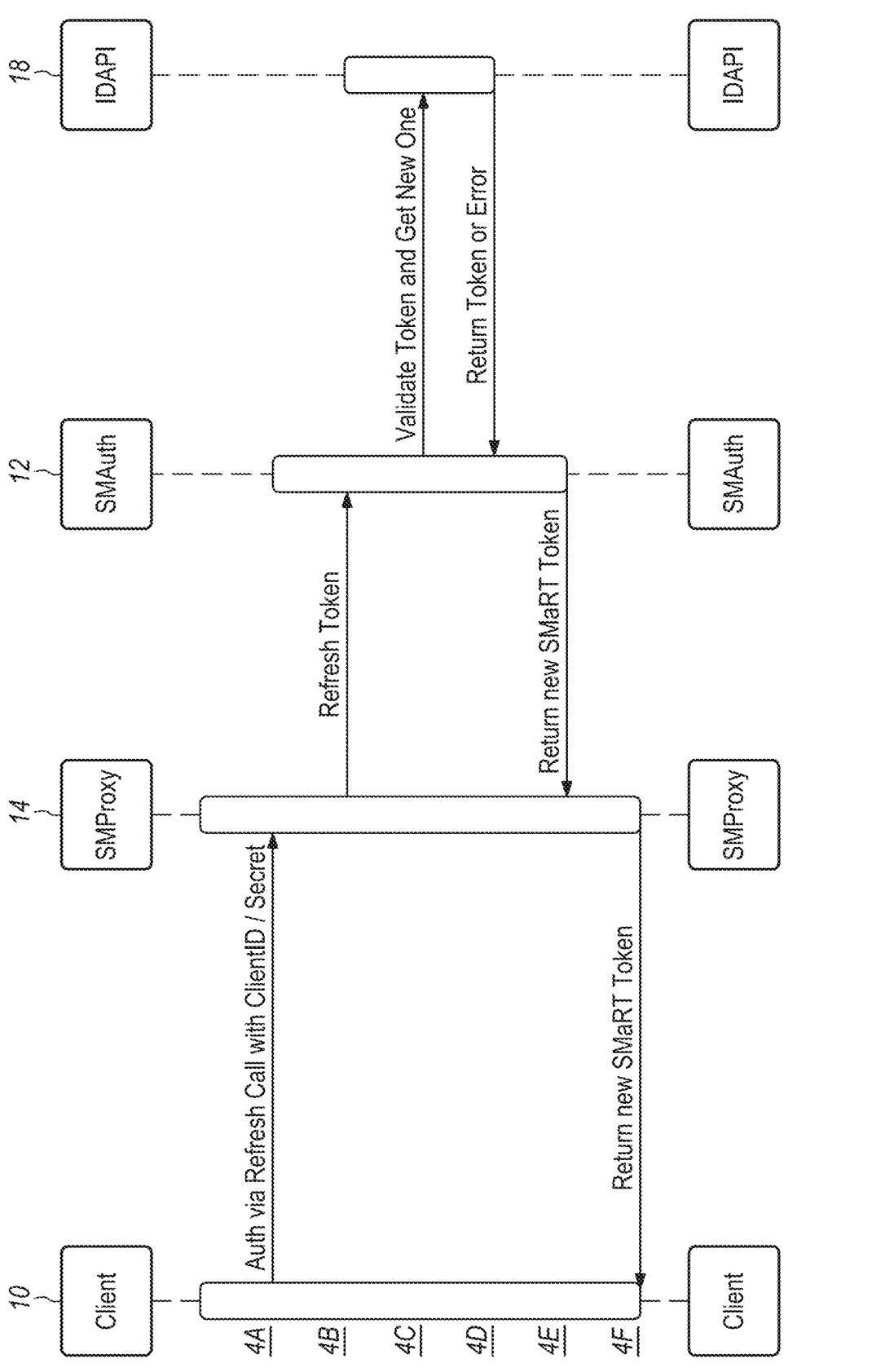
FIG. 4 is a swim lane diagram for a request (refresh) procedure according to a preferred embodiment of the present invention.

A refresh process may be performed on a regular basis, such as every 15 minutes, during use of the SMART token. This refresh process may be described with reference to the swim lane diagram of FIG. 4. When the refresh is needed, client application 10 sends the request to proxy function 14 at step 4A. At step 4B, proxy function 14 passes the refresh request to GAAS 12 (also referred to as SM Auth in the AWS environment example). Next, at step 4C, GAAS 12 sends a request for a new token to IDAPI 18 as the source of truth within the system. At step 4D IDAPI 18 responds to GAAS 12 with a return token (or an error if the token cannot be returned). GAAS 12 then returns a new (refreshed) SMART token to proxy function 14 at step 4E, and proxy function 14 in turn sends on the new SMART token to client application 10 at step 4F.

Figure 5:
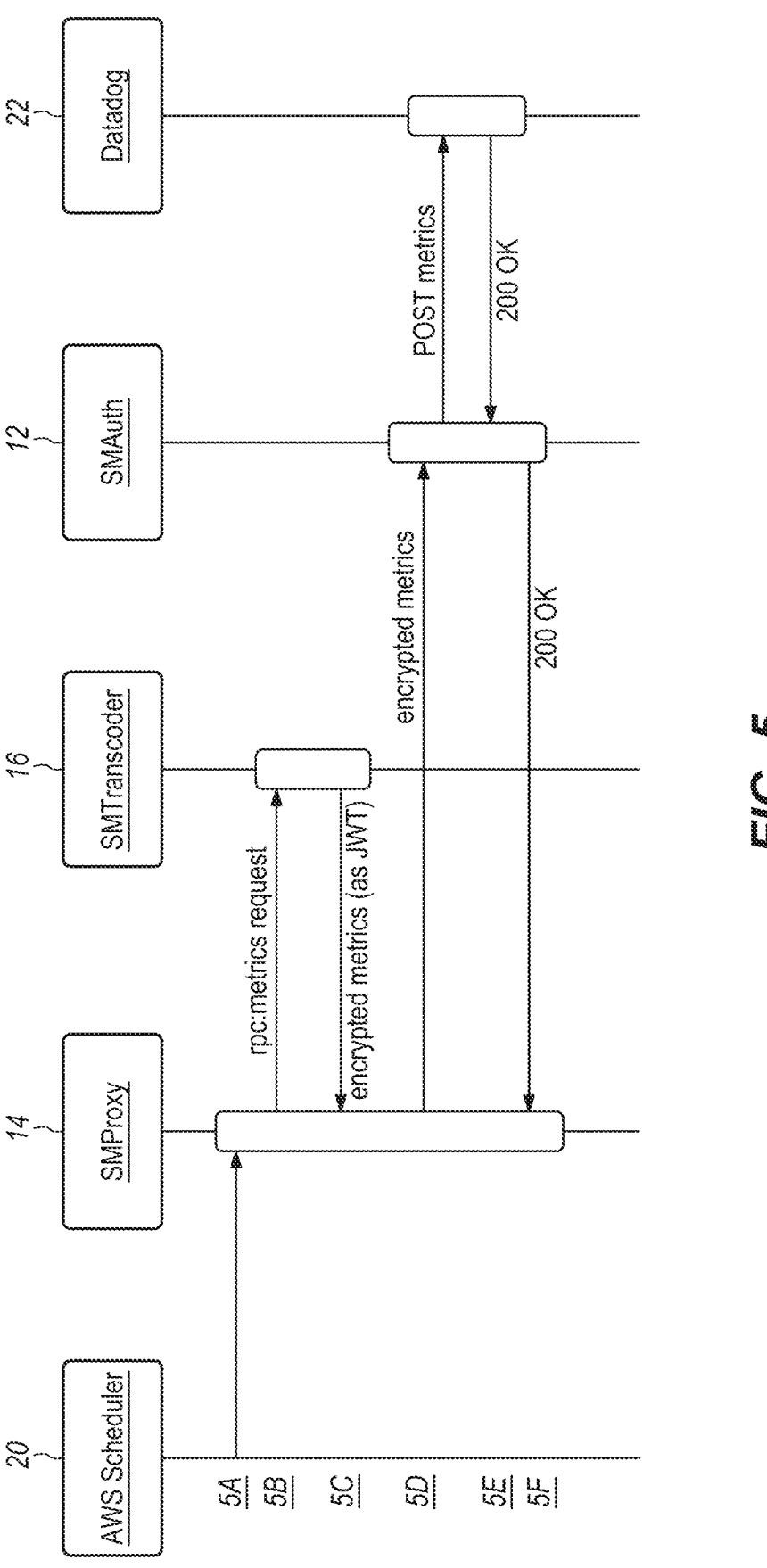
FIG. 5 is a swim lane diagram for a metrics retrieval procedure according to a preferred embodiment of the present invention.

The usage metrics data may be generated and stored as shown with reference to the swim lane diagram of FIG. 5. A scheduler (such as an AWS scheduler) 20 may initiate the process with a call to proxy function 14 at step 5A. A request is made from proxy function 14 over to embedded transcoder 16 at step 5B. The metrics generated within embedded transcoder 16 are encrypted with embedded transcoder 16's public key, and signed with its private key. Embedded transcoder 16 then packages all of this data into a JSON Web token called the metrics token, and returns it when polled by the proxy function 14 periodically at step 5C. Proxy function 14 then transports the metrics token to GAAS 12 at step 5D, which decodes it using the corresponding public key and then decrypts it using the corresponding private key to read the usage metrics data. This metrics data is written to Datadog 22, an external logging service. Datadog 22 may return an acknowledgement at step 5E, which is then passed from GAAS 12 to proxy function 14 at step 5F.

Proxy function 14 (which also may be referred to as SageMaker or SM Proxy function in the context of the AWS cloud environment) may now be described in greater detail. Proxy function 14 has two functions: request_auth and init_auth. The request_auth (request) function essentially receives an input request from the client service that typically contains the following parameters.

```
smart_token - used for authentication
transcode_data - contains the transcode data input
rpc - indicates if it is an init, request or refresh.
```

Proxy function 14 performs the following validations before performing the real operation. First, it validates if smart_token is present in the input request body. Second, it validates if transcode_data is present in the input request body. Third, it validates if rpc is present in the input request body and the value is either request or refresh. If any of these validations fail then it sends an appropriate error response to the client.

The request_auth execution steps when rpc is set to refresh are as follows. First, request_auth validates the input request body to read the client id and client secret. It then calls GAAS 12 (also known as the SM Auth Request Service in the AWS cloud environment) and passes those credentials to receive a new smart_token. Next, it validates the token for signature and expiry. If invalid or expired, it returns an appropriate error response to the client. It then sends the smart_token back to the client service.

A sample curl request for request_auth in this case may be as follows:

```
curl --location --request POST 'https://<hostname>.execute-
api.<region>. amazonaws.com/Stage/auth/request' \
--header 'Content-Type: application/json' \
--data-raw '{
  "httpMethod": "POST",
  "client_id": "<insert client id here>",
  "client_secret":"<insert client secret here>",
  "rpc" : "refresh"
}'
```

The request_auth execution steps when rpc is set to request are as follows. First, request_auth reads the input request body for the smart_token and transcode_data. It then validates the token for signature and expiry. If invalid or expired it returns an appropriate error response to the client. If the token is valid it invokes the SageMaker endpoint with the transcode data and smart token. It then receives the transcoded links from SageMaker and sends the response back to the client.

A sample curl request for request_auth in this case may be as follows:

```
curl --location --request POST 'https://<hostname>.execute-
api.<region>. amazonaws.com/Stage/auth/request' \
--header 'Content-Type: application/json' \
--data-raw '{
  "httpMethod": "POST",
  "transcode_data" : [ ],
  "smart_token" : "<insert smart token here",
  "rpc" : "request"
}'
```

The init_auth function essentially fetches the domain keys from the GAAS 12 and passes those keys to the embedded transcoder 16 to be retained for 24 hours. It receives an input request from the client service that typically contains the following parameters.

```
client_id - used for authentication.
client_secret - contains the transcode data input.
rpc - that indicates if it is an init, request or refresh.
```

The init_auth function performs the following validations before performing the real operation. First, it validates if client_id is present in the input request body. Then it validates if client_secret is present in the input request body. Next, it validates if rpc is present in the input request body and the value is init. If any of these validations fail then it sends an appropriate error response to the client.

The init_auth execution steps when rpc is set to init are as follows. First, it calls the GAAS 12 with the client credentials. Then it validates the token for signature and expiry. If invalid or expired it returns an appropriate error response to the client. If the token is valid it invokes the SageMaker endpoint and passes the INIT token to receive a response that indicates the status of transcoding initialization. Then, it extracts the smart token out of the INIT token, and then sends the smart_token and initialization response status back to the client.

A sample curl request for init_auth in this case may be as follows:

```
curl --location --request POST 'https://<hostname>.execute-
api.<region>. amazonaws.com/Stage/auth/init' \
--header 'Content-Type: application/json' \
--data-raw '{
  "httpMethod": "POST",
  "client_id": "<insert client id here>",
  "client_secret": "<insert client secret here>",
  "rpc": "init"
}'
```

The GAAS 12 (also referred to as SM Auth in the AWS environment) may now be described in greater detail.

GAAS 12 has three functions: auth_token, init_token and push_metrics that are deployed. The auth_token function performs the following operations when called by proxy function 14 in customer cloud environment 11. First, it reads the input from the proxy function 14 auth request for client credentials and appliance response (e.g., appliance token and application pub key). It then calls the IDAPI 18 token endpoint with those credentials and fetches the IDAPI authentication token. Next, it calls the/domains endpoint using the IDAPI authentication token and fetches the domain keys needed for transcoding. It then creates a scopes object that indicates the transcoding directions for the domains. Finally, it wraps the IDAPI token and SCOPES along with expiration time stamp and encodes that data to generate a JWT token called SMART TOKEN (AKA sage-makerRequestToken).

A sample curl request for auth_token in this case may be as follows:

```
curl --location --request POST 'https://<hostname>.execute-
api.<region>. amazonaws.com/Stage/token/request' \
--header 'Content-Type: application/json' \
--data-raw '{
  "httpMethod": "POST",
  "client_id": "<insert client id here>",
  "client_secret": "<insert client secret here>"
}'
```

A sample smart token response may be as follows:
eyJhbGciOiJSUzI1NilsInR5cCI6IkpXVCJ9.eyJJREFQS-V90b2tIbil6lmlkYX    BpLnRva2VuliwiZXhwaXJlcy-l6MzMxODQwNzMOMTUsInNjb3BIcyl6WyJ0MSIsI mYyliwidDMiLCJmNCIsInQ0ll19.eZvKOCMe9GJ-Oy3WDeFnMbNQhwgWAbR2iz    fs3k6o9ZziX-D57sMLssZwdEIXSPbGJT2AVCVmp5AEGo7Gfc-YBDMrRIVNZkKv 4qN8SUoCeR3WQr7Eb62qFo1-177EDhwHd2erisT840FWgNSpts54EVhWX9hVCS-UaxK24a-iKrRPgleyXRb1RtEUrBx4HFOwS-GoheSw9UBnd1-4hcpyk0s_UzSGB2TXJTEe-Fsbt0LVU-3YKmThtcRJWqg-cWqtD4fQIX8Nb-XOmxzKxka7S919DU1_vUYoWcufBmS-ZFMldfObosuq1NoBPXOQgd9fYxCaLqWhRh-L22ifKche5dlZtmG1Qxu8d7oKB3sfdiAH2KyWjP-dRXYPuiA_qAFbx2VUdbf5w-mAmRWpFWQeBg_iqpivkKvuhts6blMAjNodRCbGKxPl7HOZmfayZD3 GB_rPckt    WQNdI_7csN5JDIfrvRbuigGICxkO-KI0Mt7qKi63qQcWJus91Ed-IZhPaDcHhwJxm
A sample smart token response that is decoded may be as follows:

```
{
  "IDAPI_token": "idapi.token",
  "expires": 33184073415,
  "scopes": ["t123", "f229", "t745", "f446", "t446"]
}
```

The init_token function performs the following operations when called by the proxy function 14 in customer cloud environment 11. It executes two more steps compared to the auth function. It reads the input from the proxy function 14 init request for client credentials. It then calls IDAPI 18/token endpoint with those credentials and fetches the IDAPI authentication token. Next it calls the /domains endpoint using the IDAPI 18 authentication token and fetches the domain keys needed for transcoding. Then it creates a scopes object that indicates the transcoding directions for the domains. Next it wraps the IDAPI 18 token and SCOPES along with expiration time stamp and encodes that data to generate a JWT token called SMART TOKEN. In addition, it then encrypts the domain keys and generates cipher text, session key and initialization vector (IV) for securely transferring those to embedded transcoder 16 via proxy function 14. Finally, it wraps the SMART TOKEN (sagemakerRequestToken, CIPHER TEXT (encryptedKey-Packet), SESSION KEY (encSessionkey), IV and encodes that data to generate a JWT token called INIT TOKEN.

A sample curl request for init_token in this case may be as follows:

```
curl --location --request POST 'https://<hostname>.execute-
api.<region>.amazonaws.com/Stage/token/init' \
--header 'Content-Type: application/json' \
--data-raw '{
    "httpMethod": "POST",
    "client_id": "<insert client id here>",
    "client_secret": "<insert client secret here>",
    "appliance_token": "<insert appliance token here>",
    "application_pub_key" "<insert application pub key here>"
}'
```

The INIT token has a format of the following "<header>.<payload>.<signature>"

Where HEADER designates the type and algorithm used for JWT, the PAYLOAD is the contents of the token, and the SIGNATURE is a standard JWT signature. In this instance it is using jwt as the type and RS256 as the signature type.

The INIT Token includes a very important concept of PUBLIC and PRIVATE spaces within the PAYLOAD section.

Data within the PRIVATE section can only be accessed by having the correct private key to begin decryption of the session key and thus decryption of the PRIVATE section (encryptedKeyPacket). Only trusted systems or individuals would have this private key, and the private key proves ownership of the data.

The PRIVATE space is any data that is included within the encryptedKeyPacket (CIPHERTEXT) and could contain but is not limited to Sensitive Data, Intellectual Property, Application Data, Application Logic, Secrets, Keys, Authorization Claims, Scopes, or any other data that can be binary encoded that must be protected. The PRIVATE space also includes the IV and encSessionKey.

Data within the PUBLIC space will be public and viewable by anyone or anything that consumes or views the token. The data has authority to it as it has been added to the token by the authentication endpoint and signed with the private key of the auth endpoint. The authority can be verified using standard JWT practices. The data of this PUBLIC space cannot be modified and thus can be trusted to be true if the signature validation can be confirmed. Any party can access and use the data in the public space of this payload. Any item not in the encryptedKeyPacket, encSessionKey, or iv is considered part of the public space. In other parts of this document a SMART token (sagemakerRequestToken) is part of the Public space but is not limited to that. The PUBLIC space is available to any type of data included in the payload not in the PRIVATE space.

A sample INIT token response may be as follows:

eyJhbGciOiJSUzI1 NiIsInR5cC161kpXVCJ9.eyJzY-WdlbWFrZXJSZXF1ZXNOVG9r ZW4iOiJoZWF-kZXIucGF5bG9hZC5zaWduYXR1cmUiLCJlbmN-yeXB0ZWRLZXI QYWNrZXQiOiI8aGV41G-9ylGJhc2U2NCBIbmNvZGVkIGVuY3J5cHR1ZC- BkYXR hPilslmVuY1 NIc3Npb25LZXkiOiI8aGV4-1G9ylGJhc2U2NCBIbmNvZGVkIGVuY3J 5cHRIZ-CBzZXNzaW9ulGtleT4iLCJpdil6ljxoZXggb31gYm-FzZTY01GVuY29kZWQ gcmFuZG9tbHkgaW5-pdGFsaXpIZCB2ZWN0b31-IiwiYW55TWVOYW-RhdGEiOiJMaXZIUmFtcCBpcyB0aGUgYmVzdCB-SYW1wln0.KdlXdVbKNyl83tjaaD5yN4FpQUfkwJ-qGCvgZ4CfYNfHw4GFD8_sbF9hOr307YKu Sn6-xmw75sA2E3rffDBD8Sa3Y8Xft3Mgy7jSjAJOaZZ-mIEGP3QnLfqDQX-vHBgh_y08hlmOEOcfSE-b_17G6ZV7MITYRaiWIcxweN557H9NTJs3V1fL-sm2oK_FF2FMXAj8b6NBHihgNFR69BAD1 hg38-dng4rLKb65jwDwGWhcX5RL7YMkteTZmbC76eu-5NTRPelZUpP alflNfLaP_-CW7cKBmgcZBQ-qJsAKlj373TspK7kv6VjdwP9iVDRC89mSOKDC8-IepfvJN7luGq gmikJLO2w A sample INIT token response (PAYLOAD) that is decoded may be as follows:

```
{
    "sagemakerRequestToken":
"eyJhbGcsdjbnskjdblkpXVCJ9.eyJleHsdnsjandskljdnnnRva2Vuln0.bxh",
    "encryptedKeyPacket": "47869bc1bfc6884cd052445f1f",
    "encSessionKey": "348093284938494099a0206e212343",
    "iv": "1329439048348ac8347439"
}
```

The push_metrics function performs the following operations when called by proxy function 14. First, it reads the input from the proxy function 14 push metrics request. It then decodes metrics tokens using appliance pub key. Then it sends embedded transcoder 16 metrics to a datadog.

A sample curl request for push_metrics in this case may be as follows:

```
curl --location --request POST 'https://<hostname>.execute-
api.<region>.amazonaws.com/Stage/metrics' \
--header 'Content-Type: application/json' \
--data-raw '{
    "httpMethod": "POST",
    "metrics":
[<metrics_token_for_sm_transcoder_variant_1>,...,<metrics_token_
for_sm_transcoder_variant_n>],
    "appliance_id": "<appliance id from Transcoder response>"
}'
```

A sample metrics token may be as follows:
eyJ0eXAisdfsdfdsfdsfszl1NiJ9.eyJhfjksdfjdfjd-sfaJvzNH7f97uYxVSnlctZ-27s5yaQx7rCkA345-894n498fg84tn8fg9vPL8_tXfC2yHxsSNzbmmQiD A sample metrics token that is decoded may be as follows:

```
{
    "appliance_id": "mcsaow-8439nndjf-338nweop",
    "client_tenant": "jsd9-ksdnf-8934n-34434",
    "metrics": [
        {
            "transcode_success": 150,
            "transcode_failure": 5
        }
    ],
    "exp": 1637666645,
    "appliance_version": "0.0.1"
}
```

The systems and methods described herein may in various embodiments be implemented by any combination of hardware and software. For example, in one embodiment, the systems and methods may be implemented by a computer system or a collection of computer systems, each of which includes one or more processors executing program instructions stored on a computer-readable storage medium coupled to the processors. The program instructions may implement the functionality described herein. The various systems and displays as illustrated in the figures and described herein represent example implementations. The order of any method may be changed, and various elements may be added, modified, or omitted.

A computing system or computing device as described herein may implement a hardware portion of a cloud computing system or non-cloud computing system, as forming parts of the various implementations of the present invention. The computer system may be any of various types of devices, including, but not limited to, a commodity server, personal computer system, desktop computer, laptop or notebook computer, mainframe computer system, handheld computer, workstation, network computer, a consumer device, application server, storage device, telephone, mobile telephone, or in general any type of computing node, compute node, compute device, and/or computing device. The computing system includes one or more processors (any of which may include multiple processing cores, which may be single or multi-threaded) coupled to a system memory via an input/output (I/O) interface. The computer system further may include a network interface coupled to the I/O interface.

In various embodiments, the computer system may be a single processor system including one processor, or a multiprocessor system including multiple processors. The processors may be any suitable processors capable of executing computing instructions. For example, in various embodiments, they may be general-purpose or embedded processors implementing any of a variety of instruction set architectures. In multiprocessor systems, each of the processors may commonly, but not necessarily, implement the same instruction set. The computer system also includes one or more network communication devices (e.g., a network interface) for communicating with other systems and/or components over a communications network, such as a local area network, wide area network, or the Internet. For example, a client application executing on the computing device may use a network interface to communicate with a server application executing on a single server or on a cluster of servers that implement one or more of the components of the systems described herein in a cloud computing or non-cloud computing environment as implemented in various subsystems. In another example, an instance of a server application executing on a computer system may use a network interface to communicate with other instances of an application that may be implemented on other computer systems.

The computing device also includes one or more persistent storage devices and/or one or more I/O devices. In various embodiments, the persistent storage devices may correspond to disk drives, tape drives, solid state memory, other mass storage devices, or any other persistent storage devices. The computer system (or a distributed application or operating system operating thereon) may store instructions and/or data in persistent storage devices, as desired, and may retrieve the stored instruction and/or data as needed. For example, in some embodiments, the computer system may implement one or more nodes of a control plane or control system, and persistent storage may include the SSDs attached to that server node. Multiple computer systems may share the same persistent storage devices or may share a pool of persistent storage devices, with the devices in the pool representing the same or different storage technologies.

The computer system includes one or more system memories that may store code/instructions and data accessible by the processor(s). The system's memory capabilities may include multiple levels of memory and memory caches in a system designed to swap information in memories based on access speed, for example. The interleaving and swapping may extend to persistent storage in a virtual memory implementation. The technologies used to implement the memories may include, by way of example, static random-access memory (RAM), dynamic RAM, read-only memory (ROM), non-volatile memory, or flash-type memory. As with persistent storage, multiple computer systems may share the same system memories or may share a pool of system memories. System memory or memories may contain program instructions that are executable by the processor(s) to implement the routines described herein. In various embodiments, program instructions may be encoded in binary, Assembly language, any interpreted language such as Java, compiled languages such as C/C++, or in any combination thereof; the particular languages given here are only examples. In some embodiments, program instructions may implement multiple separate clients, server nodes, and/or other components.

In some implementations, program instructions may include instructions executable to implement an operating system (not shown), which may be any of various operating systems, such as UNIX, LINUX, Solaris™, MacOS™, or Microsoft Windows™. Any or all of program instructions may be provided as a computer program product, or software, that may include a non-transitory computer-readable storage medium having stored thereon instructions, which may be used to program a computer system (or other electronic devices) to perform a process according to various implementations. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to the computer system via the I/O interface. A non-transitory computer-readable storage medium may also include any volatile or non-volatile media such as RAM or ROM that may be included in some embodiments of the computer system as system memory or another type of memory. In other implementations, program instructions may be communicated using optical, acoustical or other form of propagated signal (e.g., carrier waves, infrared signals, digital signals, etc.) conveyed via a communication medium such as a network and/or a wired or wireless link, such as may be implemented via a network interface. A network interface may be used to interface with other devices, which may include other computer systems or any type of external electronic device. In general, system memory, persistent storage, and/or remote storage accessible on other devices through a network may store data blocks, replicas of data blocks, metadata associated with data blocks and/or their state, database configuration information, and/or any other information usable in implementing the routines described herein.

In certain implementations, the I/O interface may coordinate I/O traffic between processors, system memory, and any peripheral devices in the system, including through a network interface or other peripheral interfaces. In some embodiments, the I/O interface may perform any necessary protocol, timing or other data transformations to convert data signals from one component (e.g., system memory) into a format suitable for use by another component (e.g., processors). In some embodiments, the I/O interface may include support for devices attached through various types of peripheral buses, such as a variant of the Peripheral Component Interconnect (PCI) bus standard or the Universal Serial Bus (USB) standard, for example. Also, in some embodiments, some or all of the functionality of the I/O interface, such as an interface to system memory, may be incorporated directly into the processor(s).

A network interface may allow data to be exchanged between a computer system and other devices attached to a network, such as other computer systems (which may implement one or more storage system server nodes, primary nodes, read-only node nodes, and/or clients of the database systems described herein), for example. In addition, the I/O interface may allow communication between the computer system and various I/O devices and/or remote storage. Input/output devices may, in some embodiments, include one or more display terminals, keyboards, keypads, touchpads, scanning devices, voice or optical recognition devices, or any other devices suitable for entering or retrieving data by one or more computer systems. These may connect directly to a particular computer system or generally connect to multiple computer systems in a cloud computing environment, grid computing environment, or other system involving multiple computer systems. Multiple input/output devices may be present in communication with the computer system or may be distributed on various nodes of a distributed system that includes the computer system. The user interfaces described herein may be visible to a user using various types of display screens, which may include CRT displays, LCD displays, LED displays, and other display technologies. In some implementations, the inputs may be received through the displays using touchscreen technologies, and in other implementations the inputs may be received through a keyboard, mouse, touchpad, or other input technologies, or any combination of these technologies.

In some embodiments, similar input/output devices may be separate from the computer system and may interact with one or more nodes of a distributed system that includes the computer system through a wired or wireless connection, such as over a network interface. The network interface may commonly support one or more wireless networking protocols (e.g., Wi-Fi/IEEE 802.11, or another wireless networking standard). The network interface may support communication via any suitable wired or wireless general data networks, such as other types of Ethernet networks, for example. Additionally, the network interface may support communication via telecommunications/telephony networks such as analog voice networks or digital fiber communications networks, via storage area networks such as Fibre Channel SANs, or via any other suitable type of network and/or protocol.

Any of the distributed system embodiments described herein, or any of their components, may be implemented as one or more network-based services in the cloud computing environment. For example, a read-write node and/or read-only nodes within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A web service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP). In some embodiments, network-based services may be implemented using Representational State Transfer (REST) techniques rather than message-based techniques. For example, a network-based service implemented according to a REST technique may be invoked through parameters included within an HTTP method such as PUT, GET, or DELETE.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. When a grouping is used herein, all individual members of the group and all combinations and subcombinations possible of the group are intended to be individually included. When a range is stated herein, the range is intended to include all subranges and individual points within the range. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A method for securely delivering information in an untrusted environment, comprising the method steps of:
   at an embedded transcoder hosted in a consumer cloud environment, generating an appliance public key and an appliance private key;
   at a client application hosted in the consumer cloud environment, sending a set of customer credentials and an initialization (INIT) request to a proxy function hosted within the consumer cloud environment;

at the proxy function, requesting an application public key and an appliance token that comprises an appliance identifier (appliance ID) and the appliance public key from the embedded transcoder;

at the embedded transcoder, responding to the proxy function by sending to the proxy function the application public key and the appliance token;

at the proxy function, requesting from a generic authentication appliance system (GAAS) an authorization and INIT packet, and sending the application public key and appliance token to the GAAS;

at the GAAS, validating the application public key and returning to the proxy function an INIT token, wherein the INIT token comprises a payload comprising a public section and a private section;

at the proxy function, sending the INIT token to the embedded transcoder;

at the embedded transcoder, validating a signature on the INIT token using the appliance public key;

at the proxy function, sending a transcode request to the embedded transcoder;

at the embedded transcoder, receiving a transcode request and returning results; and at the proxy function, validating the application public key and the appliance token received from the embedded transcoder, and sending the application public key and the appliance token to the client application.

2. The method of claim 1, wherein the appliance public key is signed by an application private key within the embedded transcoder and sent to the proxy function along with application public key, and wherein the proxy function forwards the signed appliance public key and the application public key to the GAAS.

3. The method of claim 2, wherein the step of validating the application public key comprises the step of calling a secrets manager from the GAAS and validating if the application public key exists within the secrets manager.

4. The method of claim 3, further comprising the step of, after the GAAS validates the appliance token with the application public key, extracting the appliance public key out of the appliance token and then storing the appliance public key in the secrets manager.

5. The method of claim 4, wherein the private section of the INIT token is encrypted with a private key.

6. The method of claim 5, wherein the INIT token comprises secret data for use by the embedded transcoder.

7. The method of claim 6, further comprising the step of, before returning to the proxy function the INIT token, validating at an identification application programming interface source of truth (IDAPI) the set of customer credentials by retrieving the secret data from the IDAPI at the GAAS.

8. The method of claim 7, further comprising the step of encrypting the secret data at the GAAS using the appliance public key.

9. The method of claim 8, further comprising the steps of:

signing the INIT token at the GAAS with an encode key and sending the INIT token to the proxy function;

at the proxy function, sending the INIT token to the embedded transcoder;

at the embedded transcoder, validating the INIT token with a decode key; and the embedded transcoder enabling itself to serve requests after the INIT token validation is successful.

10. The method of claim 9, further comprising the steps of:

calling the proxy function from the client application with a SMART token and a set of transcode data;

calling the embedded transcoder from the proxy function to validate the SMART token and receive the set of transcode data;

processing the transcode data at the embedded transcoder and returning a set of transcode data results to the proxy function; and sending the set of transcode data results from the proxy function to the client application.

11. The method of claim 10, further comprising the steps of:

sending a refresh request from the client application to the proxy function;

passing the refresh request from the proxy function to the GAAS;

sending a request from the GAAS to the IDAPI for a new IDAPI token and secret data;

returning the IDAPI token and secret data from the IDAPI to the GAAS;

creating a new SMART token using the IDAPI token and secret data within the GAAS;

sending the new SMART token from the GAAS to the proxy function; and sending the new SMART token from the proxy function to the client application.

12. The method of claim 11, further comprising the steps of:

generating a metrics data request within the customer cloud environment, and sending the metrics data request to the proxy function;

sending the metrics data request from the proxy function to the embedded transcoder;

generating a set of metrics at the embedded transcoder;

embedding the set of metrics in a metrics token at the embedded transcoder;

encoding the metrics token with the appliance private key at the embedded transcoder, and sending the metrics token to the proxy function;

sending the metrics token from the proxy function to the GAAS, and decoding the metrics token at the GAAS with the appliance public key to recover the set of metrics; and writing the set of metrics to an external logging service.

13. A system for securing delivering information in an untrusted environment, comprising:

a consumer cloud computing environment comprising a plurality of hardware processors and associated memories;

a provider cloud computing environment comprising a plurality of hardware processors and associated memories, wherein the provider cloud computing environment is connected to the consumer cloud computing environment across an electronic communications network;

a client application hosted in the consumer cloud computing environment, wherein the client application is configured to process a set of client data and send a set of customer credentials and an initialization (INIT) request to a proxy function;

an embedded transcoder in the consumer cloud computing environment, wherein the embedded transcoder is positioned within a network isolated environment within the consumer cloud computing environment wherein the client application has restricted access, and wherein the embedded transcoder is configured to:

generate an appliance public key and an appliance private key;

provide an appliance token to the proxy function in response to a request, wherein the appliance token comprises an appliance identifier and the appliance public key;

validate a signature on an INIT token using a decode key;

receive a transcode request from the proxy function and return transcode results; and house the decode key, the appliance public key, and the appliance private key;

a generic authentication appliance system (GAAS) hosted in the provider cloud computing environment, wherein the GAAS is configured to control access to one or more provider applications in the consumer cloud computing environment, receive the appliance public key and the appliance token from the proxy function, validate the application public key, and generate an INIT token comprising an INIT header, an INIT payload, and an INIT signature, wherein the INIT payload comprises a public section and a private section; and wherein the proxy function is configured to pass communications between the client application and the GAAS, request the application public key and the appliance token from the embedded transcoder, send the application public key and the appliance token to the GAAS, receive the INIT token from the GAAS and forward the INIT token to the embedded transcoder, send a transcode request to the embedded transcoder, validate a response from the embedded transcoder, and return the validated response to the client application.

14. The system of claim 13, wherein the GAAS comprises an application programming interface (API) configured to communicate with the client application and provide access to provider applications hosted at the consumer cloud computing environment.

15. The system of claim 14, wherein the embedded transcoder comprises a container housing provider source code, provider algorithms, or provider intellectual property, or some combination thereof, and wherein the network isolated environment restricts access to the embedded transcoder from the client application.

16. The system of claim 15, wherein the proxy function is further configured to submit an API request to the GAAS to receive an authentication token.

17. The system of claim 16, wherein the proxy function is further configured to send the authentication token and the set of client data to the embedded transcoder, and in response the embedded transcoder is further configured to process the set of client data and render a set of results.

18. The system of claim 17, further comprising an identification application programming interface source of truth (IDAPI) hosted in the provider cloud computing environment and in communication with the GAAS, wherein the IDAPI is configured to validate data from the GAAS as a source of truth for the system.

19. The system of claim 18, wherein the embedded transcoder houses the decode key, an application public key and an application private key.

20. The system of claim 19, further comprising a secrets manager, wherein the GAAS is configured to validate an existence of the application public key within the secrets manager in response to an INIT request generated by the proxy function.

* * * * *